United States Patent [19]

Van Tol

[11] Patent Number: 4,555,792
[45] Date of Patent: Nov. 26, 1985

[54] TRANSMITTER FOR TRANSMITTING AN FSK-MODULATED SIGNAL

[75] Inventor: Nicolaas Van Tol, Huizen, Netherlands

[73] Assignee: U.S. Philips Corporation, New York, N.Y.

[21] Appl. No.: 423,763

[22] Filed: Sep. 27, 1982

[30] Foreign Application Priority Data

Oct. 2, 1981 [NL] Netherlands .................. 8104487

[51] Int. Cl.$^4$ .................... H04B 5/00; H04L 27/12
[52] U.S. Cl. .................................. 375/62; 375/63; 332/9 T; 455/41
[58] Field of Search ............ 375/42, 60, 62, 63, 375/74; 332/9 R, 9 T, 16 R, 17, 18; 331/182, 183; 455/42, 61, 110, 41; 178/43; 179/82; 381/79, 80, 81

[56] References Cited

U.S. PATENT DOCUMENTS

| | | | |
|---|---|---|---|
| 3,095,539 | 6/1963 | Bennett et al. | 375/63 |
| 3,812,929 | 5/1974 | Farque | 179/82 |
| 3,934,202 | 1/1976 | Missale | 179/82 |
| 3,939,422 | 2/1976 | Deise | 375/63 |
| 4,083,008 | 4/1978 | Eschke | 375/62 |
| 4,087,755 | 5/1978 | LeGrand | 375/60 |
| 4,170,764 | 10/1979 | Salz et al. | 332/17 |
| 4,199,821 | 4/1980 | Munday | 375/60 |

OTHER PUBLICATIONS

Mims, III, *Engineer's Notebook II*, Radio Shack, 1982, p. 114.
IEEE Transactions on Communications: Jun. 20, 1972, pp. 429–435.

Primary Examiner—Benedict V. Safourek
Attorney, Agent, or Firm—Robert T. Mayer; Bernard Franzblau

[57] ABSTRACT

A transmitter for transmitting FSK-modulated signals by way of an inductive aerial. A large frequency deviation, such as with FFSK-modulated signals, and a high transmission rate may cause the occurrence of a non-constant envelope. Electronic equipment arranged in the vicinity is then subjected to a greater degree of interference than with a small modulation depth and a low transmission rate. By generating in the transmitter an aerial current whose amplitude is inversely proportional to the frequency, tuning is not necessary to obtain a constant voltage envelope.

21 Claims, 3 Drawing Figures

TRANSMITTER FOR TRANSMITTING AN FSK-MODULATED SIGNAL

This invention relates to a transmitter for transmitting an FSK-modulated signal comprising a frequency controllable signal generator and an inductive aerial.

Such a transmitter is generally known and is used inter alia in traffic control systems to increase the traffic flexibility. Such a transmitter is used both in an interrogation unit arranged along a route and in a responder unit arranged in a vehicle. For transmitting signals from the interrogation unit to the responder unit the inductive aerial of the interrogation unit is generally in the form of a loop aerial provided in the road surface and for transmitting signals from the responder to the interrogation unit the inductive aerial of the responder unit is in the form of a ferrite aerial.

Arranging transmitters of this type along a route has the disadvantage that electronic equipment in the immediate vicinity, such as radio receivers in houses in the immediate vicinity of a traffic control system, are generally more sensitive to interference for transmit signals having a non-constant strength, such as occurs in the event of amplitude modulation of the transmit signal, than for transmit signals having a constant strength, as is the case in purely frequency-modulated signals. For FSK modulated signals having two signal frequencies, a low transmission rate and a small frequency swing it is possible to realize a constant amplitude of the strength of the received signals when an inductive transfer is used. The inductive aerial is then tuned in such a manner that for both signal frequencies of the FSK modulated signal equal amplitudes are obtained within the band.

With a high transmission rate relative to the carrier frequency and a large frequency deviation, tuning is not very well possible any longer owing to the large relative bandwidth.

The invention has for an object to provide a simple solution to this problem while maintaining all the properties of a low transmission rate FSK-modulated signal.

According to the invention, to accomplish this object the transmitter of the type described in the opening paragraph comprises a control arrangement for controlling the current applied to the inductive aerial so that its amplitude is inversely proportional to the frequency.

The invention is based on the intuitive perception that by generating a current in the inductive aerial whose amplitude is inversely proportional to the frequency, tuning of the aerial is no longer required to keep the amplitude of the voltage envelope constant. This now has the advantage that interference with electronic equipment arranged in the vicinity is reduced to a minimum. This interference insensitivity is obtained in a simple manner by realizing a signal frequency-independent amplitude of the received signal.

A preferred embodiment is characterized in that the signal generator is a voltage signal generator, that the control arrangement comprises an integrator connected to the signal generator and that a voltage-current converter arrangement is provided in the signal path between the integrator and the inductive aerial.

An FSK-modulated signal must be understood to mean any form of a frequency shift-modulated signal, such as a phase coherent frequency shift-modulated signal or a sinusoidually frequency shift-modulated signal.

The invention and its advantages will be further described by way of example with reference to the embodiments shown in the accompanying Figures in which:

FIG. 1 shows a transmitter for transmitting phase coherent frequency shift-modulated signals.

Figure 2:
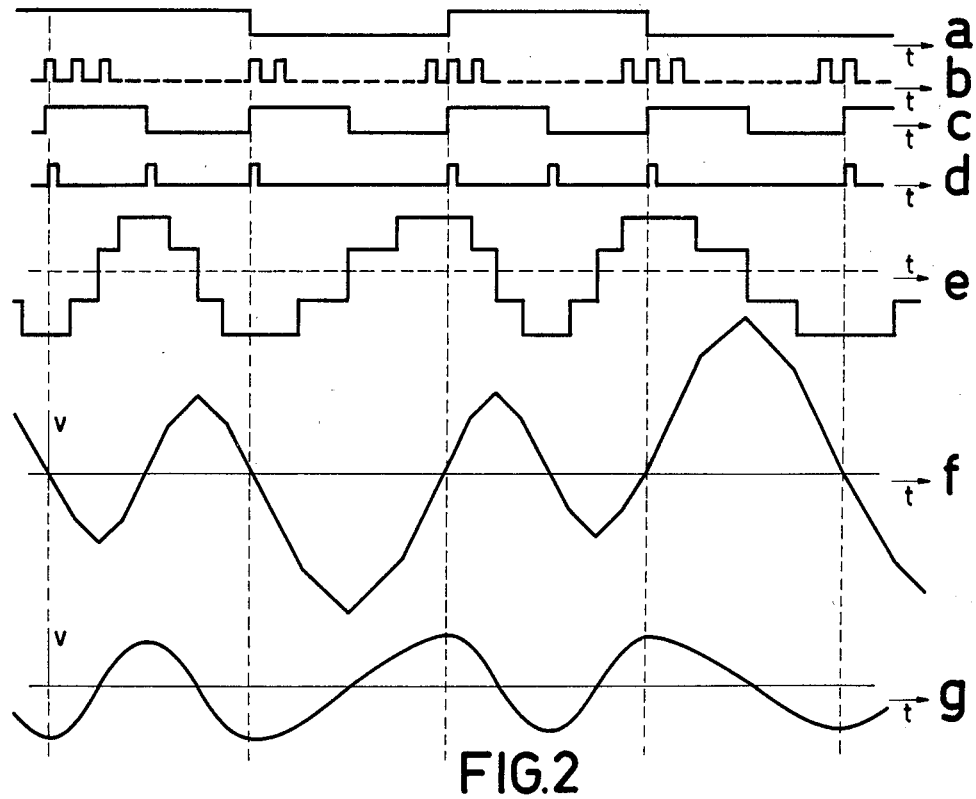
FIG. 2 shows signals which may occur in the transmitter embodiment shown in FIG. 1 and, FIG. 3 shows another control arrangement for use in the embodiment of FIG. 1.

This transmitter comprises a voltage signal generator 1 for supplying a phase coherent frequency shift-modulated signal under the control of data signals applied to a signal input 2. Via a control arrangement 3 comprising an integrator 13, 14, 23, a compensation network 21, a low pass filter 4 and a linear voltage-current converter arrangement 22, this signal is applied via a transformer 5 to an inductive aerial 6 in the form of a loop. Although any suitable type of signal generator may be used for generating the said signal, a digital signal generator is shown in this embodiment. This signal generator 1 comprises a pulse source 7 having connected thereto a divider circuit 8 comprising a first divider 9 with adjustable divisor and a second divider 10 with a fixed divisor. The pulse train produced by the pulse source 7 with, for example, a pulse repetition rate of 800 kHz is shown in FIG. 2b. When a divisor of eight is chosen for the second divider 10 the pulse signal shown in FIG. 2c is obtained. This signal is applied as a phase reference to the divider 9 and to the clock pulse input of a D-flip-flop circuit 11, whose D-input is connected to the signal input 2. From a data signal applied to the signal input 2 the D-flip-flop circuit 11 derives the switching signal shown in FIG. 2a, whose signal values correspond to those of the applied data signal and whose signal transitions coincide with the leading edges of the pulses supplied by the second divider 10 and shown in FIG. 2c. The switching signal is applied to a control input 12 of the first divider 9. Under the control of this switching signal the divisor of the first divider 9 is adjusted to the desired divisors. So, the divisor of the divider 9 is, for example, adjusted to sixteen during the period of time the switching signal is "high" and is adjusted to, for example, eight during the period of time the switching signal is "low". In addition, the first divider 9 comprises in known manner a weighting and summing network, not separately shown, for assembling for each adjusted divisor from the output signals of several individual sections of the divider 9 a specific digitally approximated sinusoidal output signal as shown in FIG. 2e. The digitally approximated sinusoidal voltage signals thus obtained are applied to the control arrangement 3. The integrator of this control arrangement comprises a resistor 23 and a differential amplifier 13 with which a capacitor 14 is arranged in parallel. In addition, the control arrangement comprises a compensation network 21 for compensating for drift and off-set of the differential amplifier 13.

For the purpose of compensation, the output signal of the integrator 23, 13, 14 is applied to a comparator 15. This comparator is in the form of a differential amplifier. The signal applied to the signal-inverting input of this differential amplifier is compared with the voltage of a reference voltage source, not shown, which is connected to the signal non-inverting input 16 of the differential amplifier 15. The output voltage of the integrator 23, 13, 14 is sampled at the instants at which the generated approximated sinusoidal signals should pass through zero. This is effected by means of a sample-and-hold circuit 17, which is, for example, in the form of a set-reset bistable element ("latch flip-flop"). For this purpose this circuit is connected to the comparator output and to the first divider 9. The information at what instants the approximated sinusoidal signal must pass through zero, independent of the frequency thereof, is derived from this divider 9, under the control of the switching signal applied thereto, and the pulse signal supplied by the generator 7. The control signal thus obtained is a pulse-shaped signal whose pulses indicate the instants at which the output signal of the integrator must pass through zero. This control signal is shown in FIG. 2d.

If the value of the output signal of the integrating network 13, 14, 23 differs at said instants from the reference voltage at input 16, the sample-and-hold circuit 17 supplies a logic signal value which corresponds with the polarity of the difference signal. By means of a further low-pass filter comprising the voltage divider 18, 19 and the capacitor 20, these signals are smoothed and applied to the signal non-inverting input of the amplifier 13.

As a result thereof the average signal value of the output of the amplifier 13 is made equal to the reference voltage, which value forms the zero level of the supplied phase coherent frequency shifted-modulated signal. Under the action of the integrator 23,13,14 the voltage shown in FIG. 2f is generated from the constant amplitude (FIG. 2e) produced by the signal generator. The amplitude of this signal is inversely proportional to its instantaneous frequency. This signal of a variable amplitude is the signal which is suitable to be applied to an inductive aerial after having been converted into a current.

After having been passed through a low-pass filter 4, to further suppress harmonics of the approximated sinusoidal signal, the variable amplitude signal is applied to a voltage-current inverter arrangement 22 for generating a current which is proportional to the voltage signal. In this embodiment the voltage-current converter arrangement comprises two transistors 24 and 25 having their emitters interconnected by means of two series arranged resistors 26 and 27 having equal resistance values.

A current source 28 is connected to the junction of the resistors 24 and 25. Each collector of the transistors 26 and 27 is connected to a different end of the primary winding of a transformer 5. A centre tap 30 of this primary winding is connected to a supply voltage source, not shown. After having been smoothed by the low-pass filter 4, the signal shown in FIG. 2f is directly applied to the base of transistor 25, and to the base of transistor 24 via a signal-inverting circuit 29. By means of this differential drive of the pair of transistors 24 and 25 the constant current produced by the current source 28 is distributed over the primary winding of transformer 5 in a ratio which is directly proportional to the voltage difference between the bases of the transistors 24 and 25. Consequently, the current flowing through this winding is directly proportional to the voltage obtained after smoothing, i.e. of the voltage shown in FIG. 2f. The proportionality constant is then determined by the values of the resistors 26 and 27. Consequently this current has the same amplitude modulation.

After having been transformed in transformer 5, necessary for d.c. separation of the loop aerial from the remaining portion of the transmitter, this transmit current is applied to the loop aerial 6.

Owing to the inductive character of the loop aerial 6, a current flowing through such an aerial generates a constant amplitude voltage as shown in FIG. 2g. This voltage ensures that the strength of the transmitted signal radiated by the inductive aerial produces a receive signal having a data modulation-independent envelope.

Any suitable value of the constant amplitude of the signal can be generated by the choice of the amplitude of the input signal, the value of the resistor 23, the capacitor 14, the sum of the resistors 26 and 27 and the inductance of the aerial 6.

In view of the fact that the amplitude of the antenna current is independent of the inductance of the antenna, the system is insensitive to temperature changes and changes in the geometry as can happen as the antenna is buried in the road surface.

Instead of a loop aerial 6, a ferrite aerial or a different type of aerial may alternatively be used, provided the aerial input is inductive.

Figure 1:
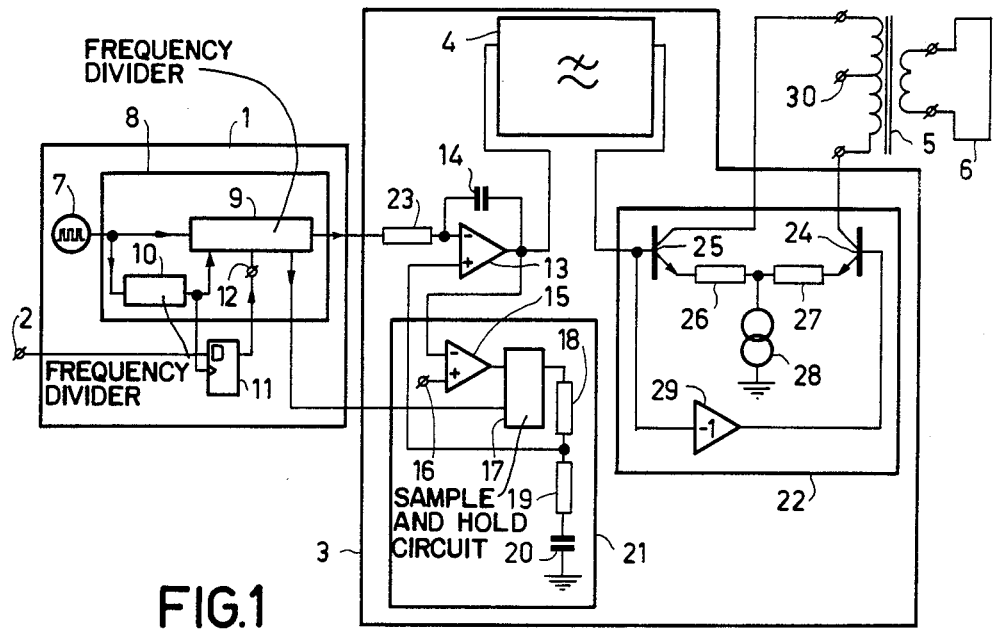
FIG. 1 shows an embodiment of a transmitter for FSK-modulated signals in accordance with the invention.
Figure 3:
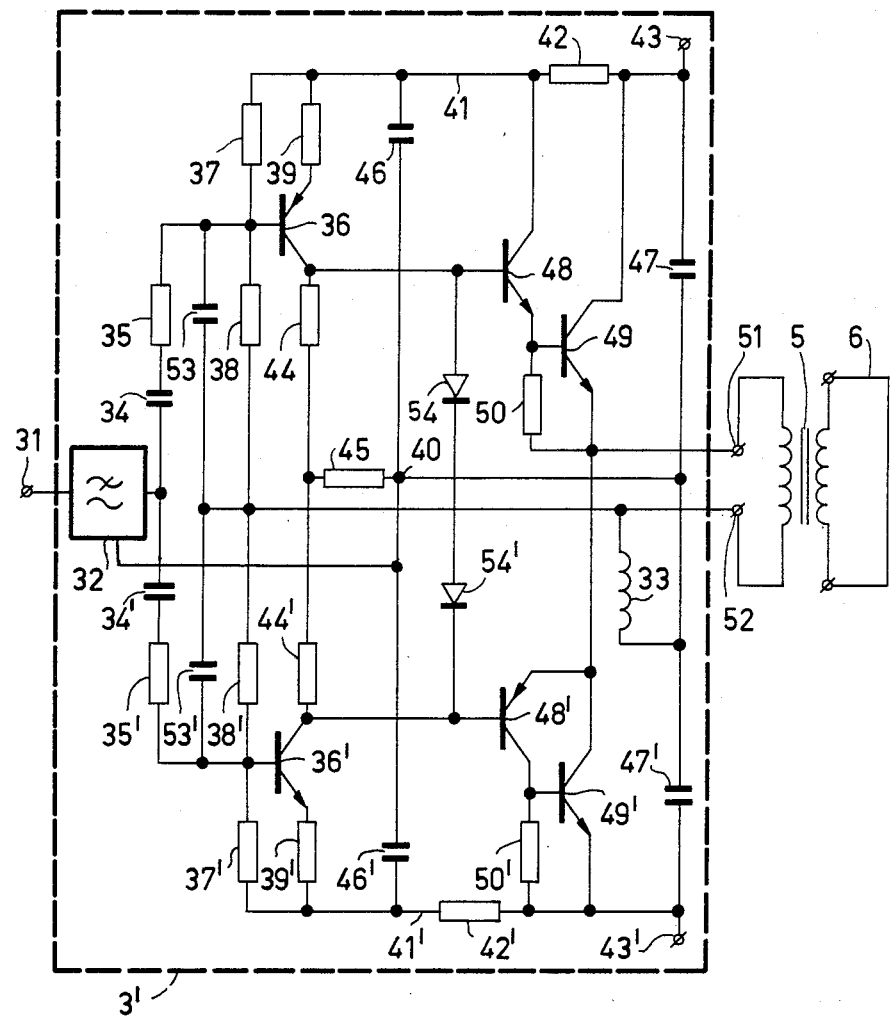

The control arrangement 3' shown in FIG. 3 may be used instead of the control arrangement 3 of FIG. 1. The output signal, shown in FIG. 2e of the voltage signal generator 1 is applied to input terminal 31 of the control arrangement 3' shown in FIG. 3. After having been filtered in low-pass filter 32 in order to suppress harmonics of the approximated sinusoidal signal, the constant-envelope FFSK-modulated signal thus obtained is applied to two complementary amplifiers comprising a feedback circuit (described hereinafter) which comprises a coil 33 for converting the input voltage into a current having an amplitude which is inversely proportional to the frequency.

To this end, the signal supplied by the filter 32 is applied to transistors 36 and 36' via input circuits which each comprise a capacitor 34, 34' and a resistor 35, 35'. The direct current through these transistors is set partly by means of the voltage dividers 37, 38, 38', 37', which voltage dividers also form part of the feedback circuit which will be described hereinafter. The emitters of transistors 36 and 36' are connected via resistors 39 and 39' to supply lines 41 and 41', which lines are connected to supply terminals 43 and 43' via resistors 42 and 42'. The collectors of the transistors 36 and 36' are connected to a reference point 40 via individual resistors 44 and 44' and a common resistor 45. This reference point 40 is connected via electrolytic capacitors 46 and 46' to the supply lines 41 and 41', and is connected to the supply terminals 43 and 43' via electrolytic capacitors 47 and 47'. Because of the symmetry of the two complementary amplifier circuits, the d.c. voltage of the reference point 40 will adjust itself to halfway between the supply voltages present on the terminals 43 and 43'.

The signals amplified by the transistors 36 and 36' are applied to the bases of two complementary emitter follower circuits 48, 49 and 48', 49', each comprising a resistor 50 and 50' connected between the bases and the emitters of the respective transistors 49 and 49'.

The signal applied by these complementary emitter followers to the output terminal 51 is proportional to the difference between the signals supplied by the two transistors 36 and 36'.

So as to make the amplitude of this current inversely proportional to the frequency of the FFSK-modulated signals to be transmitted, this output current is applied, after it has flowed through the primary winding of the output transformer 5, to the reference point 40 via the coil 33. The voltage generated across this coil 33 is applied to the inputs of the transistors 36 and 36' via feedback networks 38, 53 and 38', 53' of the feedback circuit. Since the input voltage supplied by filter 32 has a constant envelope, the voltage across the coil 33 will also have a constant envelope, as a result of which the current through the coil 33 and consequently the output current through the primary winding of the transformer 5 will have amplitudes which are inversely proportional to the signal frequency. As a result thereof, the voltage across the loop aerial 6, connected to the secondary winding of the transformer 5, has a constant envelope, which is the object of the control circuit 3'

For a.c. voltage the transistors 36 and 36' operate in parallel, as a result of which an amplification-bandwidth product is obtained which is twice as high as with a single circuit. This is advantageous for the combination of feedback factor and stability.

No severe requirements are imposed on the capacitors 47 and 47' as regards their linearity, temperature coefficient and series resistance, as the reference point 40 is used both for the input signal and for the feedback signal.

The bases of the transistors 48 and 48' are interconnected via the series arrangement of diodes 54 and 54'. These diodes together with the transistors 48 and 48' ensure that no quiescent current can flow through the transistors 49 and 49' so that they are operated in class C. Because of the high slew-rate of the output voltages of the transistors 36 and 36' the cross-over distortion remains limited.

What is claimed is:

1. A transmitter for transmitting an FSK-modulated signal comprising: a frequency controllable signal generator, an inductive aerial, and a control arrangement responsive to an output signal of the signal generator and including a current source and means for controlling the current applied to the inductive aerial so that the amplitude of said aerial current is inversely proportional to the frequency of the signal to be transmitted.

2. A transmitter as claimed in claim 1, characterized in that the frequency controllable generator comprises a pulse generator and a first divider with adjustable divisor connected thereto.

3. A transmitter as claimed in claim 1, characterized in that the signal generator comprises a voltage signal generator, in that the control arrangement comprises a low-pass filter connected to the signal generator, and in that a feedback amplifier circuit is connected to the low-pass filter, a feedback circuit of the amplifier circuit comprising an inductance through which the amplifier output current flows such that a voltage across the inductance forms the feedback voltage for the amplifier circuit.

4. A transmitter as claimed in claim 3, characterized in that the amplifier comprises two complementary transistor amplifiers which are connected in parallel for alternating current, and two series-connected capacitors connected between supply terminals of the amplifier circuit for deriving a common reference voltage for the two amplifiers.

5. A transmitter for transmitting an FSK-modulated signal comprising: a frequency controllable voltage signal generator, an inductive aerial, and a control arrangement responsive to an output signal of the signal generator for controlling the current applied to the inductive aerial so that the amplitude of said aerial current is inversely proportional to the frequency of the signal to be transmitted, and wherein the control arrangement comprises an integrator connected to the signal generator and a linear voltage-current converter arrangement coupled in a signal path between the integrator and the inductive aerial.

6. A transmitter as claimed in claim 5 characterized in that the signal path between the integrator and the inductive aerial comprises a low-pass filter.

7. A transmitter as claimed in claim 5 characterized in that the frequency controllable generator comprises a pulse generator and a first divider with adjustable divisor connected thereto, the integrator comprises a differential amplifier having a capacitor connected between an output and a signal-inverting input, a stabilizing circuit for the integrator comprising a comparator connected to the integrator, a sample-and-hold circuit connected to the comparator and having a control input connected to the first divider for sampling and holding the comparator output signal under the control of a control signal supplied by said divider, and a low-pass filter connected to the sample-and-hold circuit and having an output connected to a non-inverting signal input of the differential amplifier.

8. Apparatus for transmitting an FSK-modulated signal comprising: a frequency controllable voltage signal generator, an inductive aerial, and a control circuit for controlling the aerial current and coupled between an output of the signal generator and the inductive aerial, said control circuit including means for controlling the amplitude of the aerial current so that said current amplitude is inversely proportional to the frequency of the signal to be transmitted in a manner so as to maintain a constant aerial voltage envelope.

9. Apparatus as claimed in claim 8 wherein said signal generator comprises a digital signal generator with a signal data input terminal, a pulse generator, an adjustable frequency divider coupled to an output of the pulse generator, and wherein said frequency divider includes a frequency control input for adjusting the frequency divisor of the adjustable frequency divider under control of a data signal at said input terminal.

10. Apparatus as claimed in claim 8 wherein said signal generator includes means for generating a phase coherent frequency shift-modulated signal under control of data signals applied to a signal input terminal, and said control circuit comprises an integrator coupled to the output of the signal generator, and a low-pass filter and a linear voltage/current converter coupled in cascade with said integrator between the output of the signal generator and the inductive aerial.

11. Apparatus as claimed in claim 8 wherein said control circuit comprises, an integrator and a linear voltage/current converter connected in cascade between an output of the signal generator and the inductive aerial, said integrator including a differential amplifier having an inverting input, a non-inverting input and an output, a capacitor coupled between said differential amplifier output and said inverting input, said inverting input being coupled to said output of the signal generator, a compensation circuit comprising a comparator having a first input coupled to the output of the integrator and a second input coupled to a source of reference voltage, a sample-and-hold circuit having one input coupled to an output of the comparator and an output coupled to the non-inverting input of the differential amplifier via a low-pass filter, and means coupling a control input of the sample-and-hold circuit to a further output of the signal generator which supplies a pulse-shaped control signal indicative of zero passages of the integrator output signal.

12. Apparatus as claimed in claim 11 wherein the signal generator comprises a pulse generator supplying pulse signals to an input of an adjustable frequency divider, a frequency divider having an input coupled to receive the pulse signals from the pulse generator and an output coupled to a second input of the adjustable frequency divider, an input terminal for a data input signal, and a bistable device having an input coupled to said input terminal and an output coupled to a control input of the adjustable frequency divider, and wherein the adjustable frequency divider includes first and second outputs that comprise said signal generator output and said further output of the signal generator, respectively.

13. Apparatus as claimed in claim 8 wherein the control circuit includes a low-pass filter coupled to an output of the signal generator, a transformer having a secondary winding coupled to the inductive aerial and a primary winding, and a feedback amplifier circuit coupling the low-pass filter to said transformer primary winding, said feedback amplifier circuit including a feedback circuit having an inductor coupled to said transformer primary winding so that a feedback voltage for the amplifier circuit is developed across the inductor by means of the flow of amplifier output current in said inductor.

14. Apparatus as claimed in claim 8 wherein said means for controlling aerial current amplitude varies said current amplitude substantially without varying the tuning of the inductive aerial.

15. Apparatus as claimed in claim 8 wherein said control circuit includes a relatively fixed net inductance that is independent of the frequency of the voltage signal generator.

16. Apparatus for transmitting an FSK-modulated signal to an inductive antenna comprising: a frequency controllable voltage signal generator including means for deriving at an output thereof frequency shift modulated signals, and a control circuit for controlling antenna current having an input coupled to said output of the voltage signal generator and an output for connection to the inductive antenna, said control circuit including means for controlling the amplitude of antenna current so that said current amplitude is inversely proportional to the frequency of the signal to be transmitted whereby said antenna current is able to maintain a constant voltage envelope at the inductive antenna.

17. Apparatus as claimed in claim 16 wherein the frequency controllable generator comprises a pulse generator and a first divider with an adjustable divisor connected thereto.

18. Apparatus as claimed in claim 16 wherein the control circuit comprises: a low-pass filter connected to the signal generator, and a feedback amplifier circuit connected to the low-pass filter with a feedback circuit of the amplifier circuit comprising an inductance through which the amplifier output current flows such that a voltage across the inductance forms the feedback voltage for the amplifier circuit.

19. Apparatus as claimed in claim 16 wherein said control circuit comprises an integrator, a low-pass filter and a linear voltage/current converter coupled in cascade between the output of the signal generator and an output terminal for coupling the antenna current to said inductive antenna.

20. Apparatus as claimed in claim 16 wherein said output of the control circuit comprises a transformer having a primary winding coupled to said means for controlling the amplitude of antenna current and a secondary winding connectable to said inductive antenna.

21. Apparatus as claimed in claim 16 wherein said control circuit includes an inductor, the overall inductance of said control circuit being independent of the frequency of the voltage signal generator.

* * * * *